March 11, 1952
H. KIHN ET AL
2,589,092
VARIABLE CAPACITOR
Filed Nov. 10, 1948
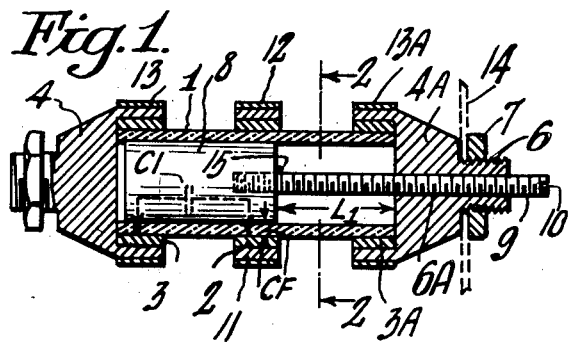
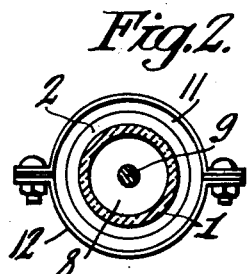
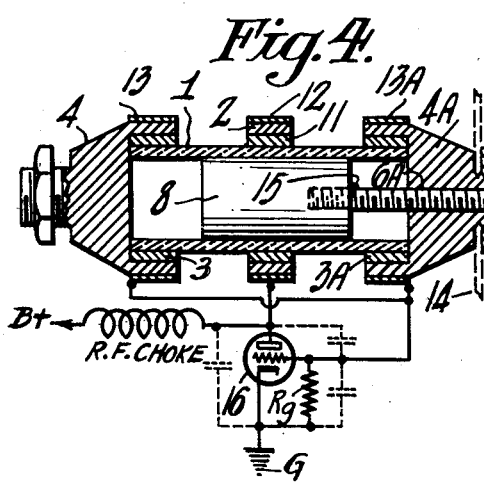
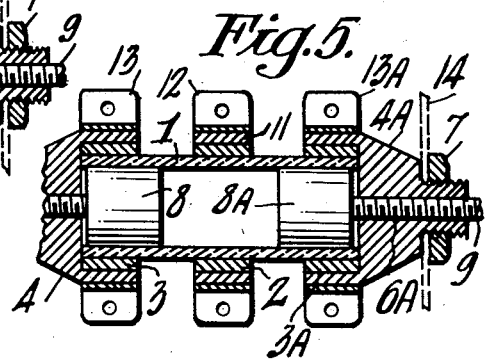
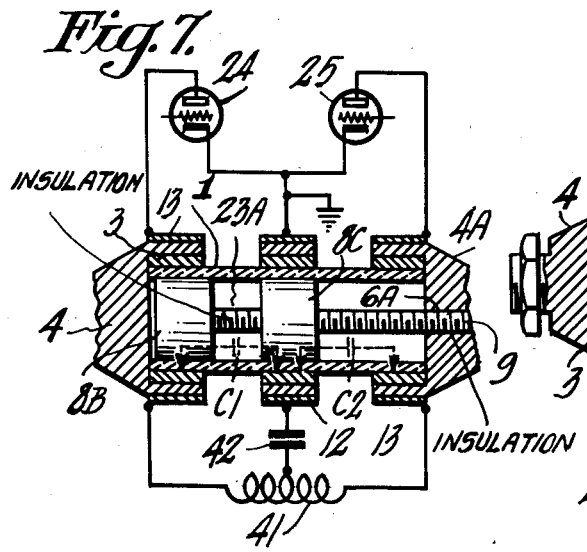
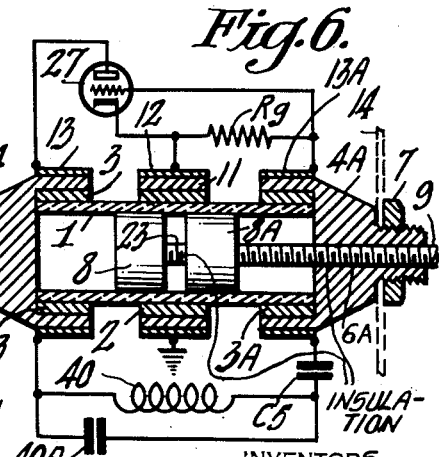
INVENTORS
HARRY KIHN
& CHANDLER WENTWORTH
BY
ATTORNEY Patented Mar. 11, 1952

2,589,092

UNITED STATES PATENT OFFICE 2,589,092

VARIABLE CAPACITOR

Harry Kihn, Lawrenceville, and Chandler Wentworth, Princeton, N. J., assignors to Radio Corporation of America, a corporation of Delaware Application November 10, 1948, Serial No. 59,304

2 Claims. (Cl. 175—41.5)

This invention is a continuation-in-part of our copending application, Serial No. 568,594, filed December 18, 1944, now abandoned, and relates to a new and useful type of variable capacitor which is particularly adapted for ultra high frequencies.

An object of this invention is to provide a low loss physically small but relatively high capacity variable capacitor for use over a wide frequency range, particularly at ultra high frequencies on the order of 500 megacycles.

Another object of this invention is to provide a capacitor which can be used in a novel series self-resonant circuit operating near 1,000 megacycles and having a very wide tuning range.

A feature of this invention is the novel arrangement of a dielectric tube having a plurality of metallic coatings on the outside thereof; and a plurality of metallic electrode slugs which are arranged to be moved within the inside of the ceramic tube to vary the capacity of the device; and low inductance connectors associated therewith.

Although small tubular variable capacitors are old in the prior art, they are generally not suited for use at ultra high frequencies for the reason that the electrode width and spacing are not generally in the proper proportion to give best results and the terminal construction and mounting means generally consist of several turns of wire of a small diameter having a large amount of undesired inductance. The capacitors of this invention have electrode width and spacing in proper proportion to give best results and the terminals are arranged to provide a low loss circuit with an improved mounting and terminal means, which terminal means has a large cross-sectional area, permitting low inductance connections.

This invention will be best understood by referring to the accompanying drawing, in which:

Fig. 1 is a longitudinal sectional view of a capacitor having a movable slug electrode and three fixed electrodes, the movable slug being show in the maximum capacitance and inductance position.

Fig. 2 is a cross-sectional view of Fig. 1 taken along line 2—2 of Fig. 1.

Fig. 3 is a circuit diagram of a series resonant circuit using the condenser shown in Figs. 1 and 2.

Fig. 4 is a longitudinal sectional view of the capacitor of Fig. 1, showing the movable slug in the minimum capacitance position and with the capacitor connected in a circuit of a Colpitts oscillator.

Fig. 5 is a longitudinal sectional view of a capacitor having two movable electrodes and three fixed electrodes.

Fig. 6 is a longitudinal sectional view and a circuit diagram of a variable capacitor having two movable electrodes which are joined together with an insulating member so that the two electrodes may be moved simultaneously; and Fig. 7 is a longitudinal sectional view of a modification of Fig. 6.

Referring now in detail to Figs. 1 and 2 of the drawing, a thin ceramic or other dielectric material tube 1 is preferably of titanium dioxide that has been specially processed to have a dielectric constant between 70 and 80. However, any other suitable titanate may be used. The actual size of tube 1 for a practical condenser of this invention is $\frac{3}{16}$ inch outside diameter and $\frac{1}{2}$ inch long and approximately $\frac{1}{32}$ inch wall thickness. Capacity variation is from 1 to 7 micromicrofarads with a Q of about 500. On the outer surface of the ceramic tube 1, there are three coated zones 2, 3 and 3A, consisting of silver or copper which is plated on the outside of the ceramic tube. The lengths of all of the fixed electrode coatings 2, 3 and 3A are substantially the same. The spaces between the fixed electrodes are equal but slightly greater than the electrode lengths. Throughout this application "electrode length" means the longitudinal or axial length. One of the coated zones 2 serves as the central fixed electrode of the condenser. The two other electrodes or coated zones 3 and 3A each has secured thereto a respective metallic cap or mounting means 4 or 4A which is soldered to the respective coating. The outside end of each of the mounting means 4 and 4A is externally threaded at 6 and internally threaded at 6A. The external threaded portion 6 is provided with a mounting nut 7. Within the ceramic tube there is a metallic slug 8 which is securely fastened to a threaded metallic tuning rod 9. The threaded tuning rod 9 is arranged to vary the position of the slug 8 within the dielectric tube 1 by turning it in the internal threads 6A which run through one of the mounting means 4A. The end of rod 9 is provided with a slotted portion 10 for inserting a screw driver or any other suitable means (not shown), to rotate the rod to provide the proper adjustment of capacity. The portion of the metallic tuning rod 9 between the point 15 and the inner face of the second mounting member 4A provides a variable inductance indicated as LI. The fixed electrode or coated zone 2 is provided with a silver plated brass collar or ring 11 to which a low inductance connection member 12 is secured. A second low inductance terminal connection 13 surrounds the mounting member 4. A third low inductance connection 13A surrounds the other mounting member 4A. The terminal connections 12, 13 and 13A are preferably made of two semi-circular heavy metallic straps of suitable lengths. The ends of the straps are clamped over members 11, 4 and 4A by any suitable means such as, for example, a pair of bolts and nuts, as shown in Fig. 2. The dotted line 14 indicates the position of the panel or metal member to which the capacitor is secured.

Figure 3 shows a novel circuit using a condenser of this invention as shown by Figs. 1 and 2 wherein a series resonant circuit is provided which operates at a frequency range of about 1,000 megacycles. The nearly fixed capacitor CF is formed through the dielectric 1 from slug 8 to electrode 2. The variable inductance LI is along the metallic rod 9 from a point 15 to the inside wall of part 4A. The variable capacity CI is from slug 8 through dielectric 1 to electrode 3. There is also some capacity from the face of slug 8 through the air gap to the inside face of part 4. It will be noted that between terminals 13 and 13A there is provided a series resonant circuit. The slug 8 is shown in Fig. 1 as being in the lowest frequency position wherein there is maximum capacity and inductance. Although fixed electrode 2 is shown in the center of tube 1, it may be placed slightly to either side of the center if more or less inductance is required for a given circuit. The central fixed silver coated electrode 2 provides a high value of capacity CF at the normal central position of the movable electrode or tuning slug 8. This capacity is large in proportion to the capacities provided between electrode 2 and the respective fixed electrodes 3 and 3A because the large dielectric constant of the dielectric tube 1 is between 70 and 80, whereas the dielectric constant of air is only unity or one.

The showing of Fig. 4 is similar to Fig. 1, except that the slug 8 is shown in the position of the highest frequency and with minimum capacity and inductance. This figure also shows the circuit diagram of a Colpitts oscillator wherein the capacitor central electrode 2 is connected to the plate of a thermionic tube 16. The two outer electrodes are connected together and have connections to the grid. A resistance $R_g$ connects the grid to the cathode. The dotted lines indicate the circuit capacities formed by the interelectrode capacity between the tube elements. A radio frequency choke provides a connection from the plate to battery B+. This circuit of Fig. 4 can be used as an oscillator to provide a wide range of frequency variation. It will be noted that an external connection is to be made between the two outer fixed electrodes 3A and 3, as indicated by a line which also connects to the grid of tube 16.

The variable capacitor shown in Fig. 5 is similar to Fig. 1, except that identical threaded end mounting means 4, 4A are provided at each end thereof, and in addition thereto, there are two movable electrode slugs 8 and 8A which are arranged to move independently of each other within ceramic tube 1. The axial lengths of slugs 8 and 8A are 1½ times the equal electrode lengths of coatings 2, 3 and 3A. The strap members 12, 13 and 13A are low inductance connection straps which are similar to those described in connection with Fig. 1. This condenser is particularly useful for push-pull amplifiers, oscillators, balanced detectors and frequency discriminators.

In the modified twin variable capacitor shown in Fig. 6, electrodes 8 and 8A are arranged to be spaced by, and securely fastened to, a threaded insulating rod 23 which maintains variable electrodes 8 and 8A in the proper spaced relationship. The tuning rod 9 is also of insulation material. The central fixed electrode 2 has a length which is twice the length of the other fixed electrodes. The lengths of the movable electrodes 8 and 8A and their spacing are such that when they are in the midposition the extreme ends of the fixed electrode 2 will register directly with the center of each movable electrode, as shown in Fig. 6. The axial spacing between the coatings is approximately equal to the length of the end coatings or electrodes. This device has been used with a Colpitts oscillator for a radio transmitter having a frequency of about 500 megacycles. The circuit includes oscillator tube 27, resistance $R_g$, and an inductance 40 connected between the plate and grid through blocking condenser C5. The size and spacing arrangement of the fixed electrodes 2, 3 and 3A, together with the variable electrodes 8 and 8A, forms the two capacities $Cpk$ and $Cgk$. $Cpk$ is the capacity between central fixed electrode 2 and end electrode 3 through the dielectric 1 and the inner movable electrode 8. $Cgk$ is the capacity between the central fixed electrode 2 and the end electrode 3A through the dielectric 1 and the other movable electrode 8A. A small or stray portion of these capacities is through the air and dielectric 1. With this specific electrode spacing arrangement the capacity $Cpk$ increases as $Cgk$ decreases, and vice versa, but the total capacity $$Ct = \frac{CpkCgk}{Cpk+Cgk}$$

tends to remain constant for all practical tuning purposes. This permits variation of the oscillator feedback voltage but at the same time tends to maintain a fixed resonant frequency, which is a desired feature in a Colpitts oscillator. As mentioned above a low loss inductance connection can be arranged to surround the centrally located coated electrode zone 2. The end mounting members 4 and 4A are connected to inductance 40 with low inductance connections 13 and 13A, the connection to 4A being through capacitor C5.

Another modification of a variable capacitor, particularly adapted to push-pull or balanced systems (amplifiers, oscillators, etc.), is shown in Fig. 7. This is similar to the condenser of Fig. 6 except that C1 and C2 vary in the same sense with rotation of the insulated tuning rod 9. Also, the slugs 8B and 8C of Fig. 7 are each threaded at one end thereof to receive a threaded insulating rod 23A, which rod is longer than rod 23 of Fig. 6 and is arranged so that the two electrodes 8B and 8C may be moved simultaneously with rotation of rod 9. Electrodes 8B and 8C are both secured to rod 23A. The center electrode is shorter than electrode 2 of Fig. 6, and is approximately equal to the length of the end electrodes. The length of each movable electrode 8B and 8C is substantially equal to the spacing between each successive pair of electrodes, or to the length of each fixed electrode. This form of capacitor is desirable in a circuit having push-pull tubes 24 and 25, the anodes of which are connected to inductance 41 which is connected to ground through the bypass condenser 42. The circuit is tuned by movement of electrodes 8B and 8C. With this arrangement, both the capacities C1 and C2 increase simultaneously and to the same extent, and decrease in the same manner.

The drawings show the devices in approximate proportion, and are drawn much larger than the actual devices, in the interest of clarity. It will be understood that slight changes in inductance and capacity values may be necessary, and they may be accomplished by adjusting the position of the movable electrode on the threaded rod or rods, grinding away some of the coated surfaces of the fixed electrodes, or by other suitable adjustments.

While we have described our invention with respect to several specific arrangements, we do not wish to be limited to such construction and applications.

What is claimed is:

1. A radio frequency tuning capacitor, comprising a ceramic tube having three spaced metallic coatings on its outer wall forming the end and intermediate fixed electrodes of said capacitor, the intermediate electrode being of greater axial length than the end electrodes and the axial spacing between adjacent coatings being substantially equal to the axial length of each of the end coatings, a separate metallic mounting means at each end of said tube in electrical contact with a corresponding one of the end coatings, a pair of longitudinally movable metallic slugs forming variable electrodes for said capacitor, each of said slugs having an axial length smaller than that of said intermediate electrode, insulating means securely joining said slugs in spaced relationship, and means for simultaneously moving both of said slugs, the arrangement being such that in the mid-position of said slugs, each end of the intermediate coating lies in a plane passing through the center of the length of a corresponding one of the slugs.

2. A capacitor in accordance with claim 1, wherein the axial lengths of the slugs are equal to each other and each equal to the axial length of the end coatings, wherein said slugs are spaced apart a distance less than one-half of the axial length of the end coatings, and wherein the means for moving the slugs passes through one of the two mounting means.

HARRY KIHN.
CHANDLER WENTWORTH.

REFERENCES CITED

The following references are of record in the file of this patent:

UNITED STATES PATENTS

| Number | Name | Date |
| --- | --- | --- |
| Re. 20,189 | Roosenstein | Dec. 1, 1936 |
| 2,014,422 | Carter | Sept. 17, 1935 |
| 2,036,084 | Roder | Mar. 31, 1936 |
| 2,154,778 | Schnell | Apr. 18, 1939 |
| 2,209,626 | Larkin | July 30, 1940 |
| 2,364,291 | Harvey | Dec. 5, 1944 |
| 2,384,504 | Thias | Sept. 11, 1945 |

FOREIGN PATENTS

| Number | Country | Date |
| --- | --- | --- |
| 560,372 | Great Britain | Mar. 31, 1944 |